United States Patent
Tabet et al.

(10) Patent No.: US 10,383,063 B2
(45) Date of Patent: *Aug. 13, 2019

(54) RADIO LINK MONITORING FOR LINK-BUDGET-LIMITED DEVICES

(71) Applicant: Apple Inc., Cupertino, CA (US)

(72) Inventors: Tarik Tabet, Los Gatos, CA (US); Samy Khay-Ibbat, San Francisco, CA (US); Awais M. Hussain, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,919

(22) Filed: Aug. 19, 2018

(65) Prior Publication Data
US 2018/0359709 A1    Dec. 13, 2018

Related U.S. Application Data

(60) Division of application No. 15/605,977, filed on May 26, 2017, now Pat. No. 10,057,860, which is a (Continued)

(51) Int. Cl.
*H04W 52/24* (2009.01)
*H04W 72/04* (2009.01)
(Continued)

(52) U.S. Cl.
CPC ........... *H04W 52/241* (2013.01); *H04L 5/005* (2013.01); *H04L 5/0057* (2013.01);
(Continued)

(58) Field of Classification Search
CPC . H04W 52/241; H04W 52/262; H04W 52/32; H04W 72/0473; H04W 72/048; H04W 72/085; H04L 5/005; H04L 5/0057
See application file for complete search history.

(56) References Cited

U.S. PATENT DOCUMENTS

9,444,570 B1    9/2016 Mansour et al.
2002/0163980 A1    11/2002 Ruohonen
(Continued)

*Primary Examiner* — Dominic E Rego
(74) *Attorney, Agent, or Firm* — Meyertons Hood Kivlin Kowert and Goetzel PC; Jeffrey C. Hood (57) ABSTRACT

A link-budget-limited wireless communication device (UE) may implement improved radio link monitoring procedures for enhancing the link-budget of the UE. The UE may monitor the radio link and may determine whether the radio link can support a lowest acceptable link quality according to a hysteresis-based comparison that uses threshold values to determine error rates associated with a physical control channel. The UE may also identify itself to the network as a link-budget-limited device, and the network may enable special link-budget enhancing features for the UE, including boosting the power of the resource elements (REs) carrying physical channel signaling/data to the UE. The UE may detect the presence of power boost and may estimate/determine the power boost level. The UE may modify the threshold values based on the power boost detection and/or results of the power boost level estimation/determination, and may use the modified threshold values for determining radio link quality during radio link monitoring.

20 Claims, 6 Drawing Sheets

Related U.S. Application Data continuation of application No. 15/349,816, filed on Nov. 11, 2016, now Pat. No. 9,681,395.

(60) Provisional application No. 62/255,364, filed on Nov. 13, 2015.

(51) Int. Cl.
  *H04L 5/00*    (2006.01)
  *H04W 52/26*   (2009.01)
  *H04W 52/32*   (2009.01)
  *H04W 72/08*   (2009.01)

(52) U.S. Cl.
  CPC ......... *H04W 52/262* (2013.01); *H04W 52/32* (2013.01); *H04W 72/048* (2013.01); *H04W 72/0473* (2013.01); *H04W 72/085* (2013.01)

(56) References Cited

U.S. PATENT DOCUMENTS

| | | |
|---|---|---|
| 2003/0096631 A1 | 5/2003 | Kayama et al. |
| 2004/0190486 A1 | 9/2004 | Oshiba |
| 2004/0218559 A1 | 11/2004 | Kim et al. |
| 2005/0008364 A1 | 1/2005 | Roberts et al. |
| 2006/0168343 A1 | 7/2006 | Ma et al. |
| 2008/0019279 A1 | 1/2008 | Kim |
| 2009/0034474 A1 | 2/2009 | Yavuz et al. |
| 2012/0295656 A1 | 11/2012 | Yang et al. |
| 2013/0260744 A1 | 10/2013 | Xu et al. |
| 2013/0315157 A1 | 11/2013 | Krishnamurthy |
| 2014/0126534 A1 | 5/2014 | Larsson et al. |
| 2014/0133333 A1 | 5/2014 | Liu |
| 2014/0301302 A1 | 10/2014 | Xu et al. |
| 2015/0110056 A1 | 4/2015 | Wang et al. |
| 2015/0141027 A1* | 5/2015 | Tsui .................. H04W 52/243 455/452.1 |
| 2015/0223084 A1 | 8/2015 | Lightstone |
| 2016/0066209 A1 | 3/2016 | Lin |
| 2016/0269137 A1 | 9/2016 | Lindoff et al. |
| 2016/0278103 A1 | 9/2016 | Kazmi et al. |
| 2016/0295529 A1 | 10/2016 | Rico Alvarino et al. |
| 2016/0353316 A1 | 12/2016 | Boettger et al. |
| 2017/0034840 A1 | 2/2017 | Mandil et al. |
| 2017/0149514 A1 | 5/2017 | Comsa |

* cited by examiner

RADIO LINK MONITORING FOR LINK-BUDGET-LIMITED DEVICES

PRIORITY CLAIM

This application is a divisional application of U.S. patent application Ser. No. 15/605,977 titled "Radio Link Monitoring for Link-Budget-Limited Devices", filed on May 26, 2017, now U.S. Pat. No. 10,057,860, which itself is a continuation of U.S. patent application Ser. No. 15/349,816 titled "Radio Link Monitoring for Link-Budget-Limited Devices", filed on Nov. 11, 2016, now U.S. Pat. No. 9,681,395, which itself claims benefit of priority of U.S. Provisional Patent Application Ser. No. 62/255,364 titled "Radio Link Monitoring for Link-Budget-Limited Devices", filed on Nov. 13, 2015, all of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless devices, and more particularly to an apparatus, system, and method for improved radio link monitoring for link-budget-limited devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In wireless data communications, automatic repeat request (ARQ; also referred to as automatic repeat query), is used as an error-control method for data transmission that uses acknowledgements (messages sent by the receiver indicating that it has correctly received a data frame or packet) and timeouts (specified time periods allowed to elapse before an acknowledgment is received) to achieve reliable data transmissions. If the sender does not receive an acknowledgment before the timeout, it usually re-transmits the frame/packet until the acknowledgment is received, or the number of re-transmissions has exceeded a predefined limit.

Hybrid automatic repeat request (HARQ) is a combination of high-rate forward error-correcting coding and ARQ error-control. In standard ARQ, redundant bits are added to the data to be transmitted using an error-detecting code such as a cyclic redundancy check (CRC), with receivers detecting a corrupted message requesting a new message from the sender. In Hybrid ARQ, the original data is encoded with a FEC (forward error correction or forward error coding) code, and the parity bits are either immediately transmitted along with the message, or they are transmitted only upon request by a receiver that has detected an erroneous message. The FEC code is typically used to correct an expected subset of all errors that may occur, while the ARQ provides a fallback to correct errors that cannot be corrected through the use of only the redundancy included in the initial transmission. Therefore, hybrid ARQ offers better performance in poor signal conditions, but at the expense of significantly lower throughput during good signal conditions. A signal quality crossover point may be defined, below which simple HARQ may be preferred, and above which basic ARQ may be used.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines various physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to device design, device size, battery size, current transmission medium conditions, and/or other factors) may be referred to in some instances as "link-budget-limited" or "link-budget-limited" devices. It would be desirable to provide improved packet switched wireless communication services to various types of mobile devices, including link-budget-limited devices.

Other corresponding issues related to the prior art will become apparent to one skilled in the art after comparing such prior art with the present invention as described herein.

SUMMARY OF THE INVENTION

In light of the foregoing and other concerns, some embodiments relate to a wireless communication device or user equipment (UE) configured to perform accurate radio link monitoring. In some embodiments, a link-budget-limited wireless communication device may implement improved radio link monitoring procedures for enhancing the link-budget of the UE. The UE may monitor the radio link from the network, and may determine whether the radio link can support a lowest acceptable link quality according to a hysteresis-based comparison that uses at least two threshold values in determining block error rates associated with a physical control channel, such as the Physical Downlink Control Channel (PDCCH). The UE may also identify itself to the network as belonging to special class of devices, more specifically a class that includes link-budget-limited devices. Responsive to identifying the UE as a link-budget-limited device, the network may enable special link-budget enhancing features for the UE.

The special link-budget enhancing features may include the network (or base station facilitating communications of the UE according to the given radio access technology) boosting or increasing the power of the resource elements (REs) carrying physical channel signaling/data to the UE above what may be considered normal or customary power levels the network uses for communicating with other (standard or non-link-budget-limited) wireless communication devices. In other words, the network may increase the power at which the aforementioned resource elements are transmitted with respect to the power levels otherwise used by the network for transmission of those resource elements. Furthermore, the network may increase the power level at which those resource elements are transmitted to be higher than the power levels at which the network was transmitting those resource elements prior to the UE identifying itself to the network as a link-budget-limited device. In turn, the UE may detect the presence of a power boost (increase) and may estimate/determine the power boost level, or the amount by which the power used for transmitting the given resource elements was increased by the network. The UE may modify the (at least two) threshold values based on (or according to) the power boost detection and/or results of the power boost level estimation/determination, and may use the modified threshold values for determining radio link quality during radio link monitoring, to more accurately determine the radio link quality.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Acronyms that may appear throughout the present Patent Application:
UE: User Equipment
BS: Base Station
ENB: eNodeB (Base Station)
GSM: Global System for Mobile Communication
UMTS: Universal Mobile Telecommunication System
LTE: Long Term Evolution
CS: Circuit-switched
PS: Packet-switched
CSFB: Circuit-switched fallback
MME: Mobile Management Entity
MSC: Mobile Switching Center
RNC: Radio Network Controller
RRC: Radio Resource Control
MT: Mobile Terminating
RLM: Radio Link Monitoring
RE: Resource Element[s]
BLER: Block Error Rate
PDCCH: Physical Downlink Control Channel
PDSCH: Physical Downlink Shared Channel
SNR: Signal-to-Noise Ratio
RLF: Radio Link Failure
CRS: Cell-Specific Reference Signals
RB: Resource Block
CQI: Channel Quality Indicator
SINR: Signal-To-Interference-Plus-Noise Ratio
DCI: Downlink Control Information
TTI: Transmit Time Interval
SIB: System Information Block Terms The following is a glossary of terms used in the present application:
Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable electronic devices such as smart watches and/or smart glasses (e.g. Apple Watch™, Google Glass™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Link-budget-limited—includes the full breadth of its ordinary meaning, and at least includes a characteristic of a wireless device (a UE) which exhibits limited communication capabilities, or limited power, relative to a device that is not link-budget-limited, or relative to devices for which a radio access technology (RAT) standard has been developed. A UE that is link-budget-limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link-budget-limited" (or "link-budget-constrained") devices. A device may be inherently link-budget-limited due to its size, battery power, and/or transmit/receive power. For example, a smart watch that is communicating over LTE or LTE-A with a base station may be inherently link-budget-limited due to its reduced transmit/receive power and/or reduced antenna. Wearable devices, such as smart watches, are generally link-budget-limited devices. Alternatively, a device may not be inherently link-budget-limited, e.g., may have sufficient size, battery power, and/or transmit/receive power for normal communications over LTE or LTE-A, but may be temporarily link-budget-limited due to current communication conditions, e.g., a smart phone being at the edge of a cell, etc. It is noted that the term "link-budget-limited" includes or encompasses power limitations, and thus a power limited device may be considered a link-budget-limited device.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 1:
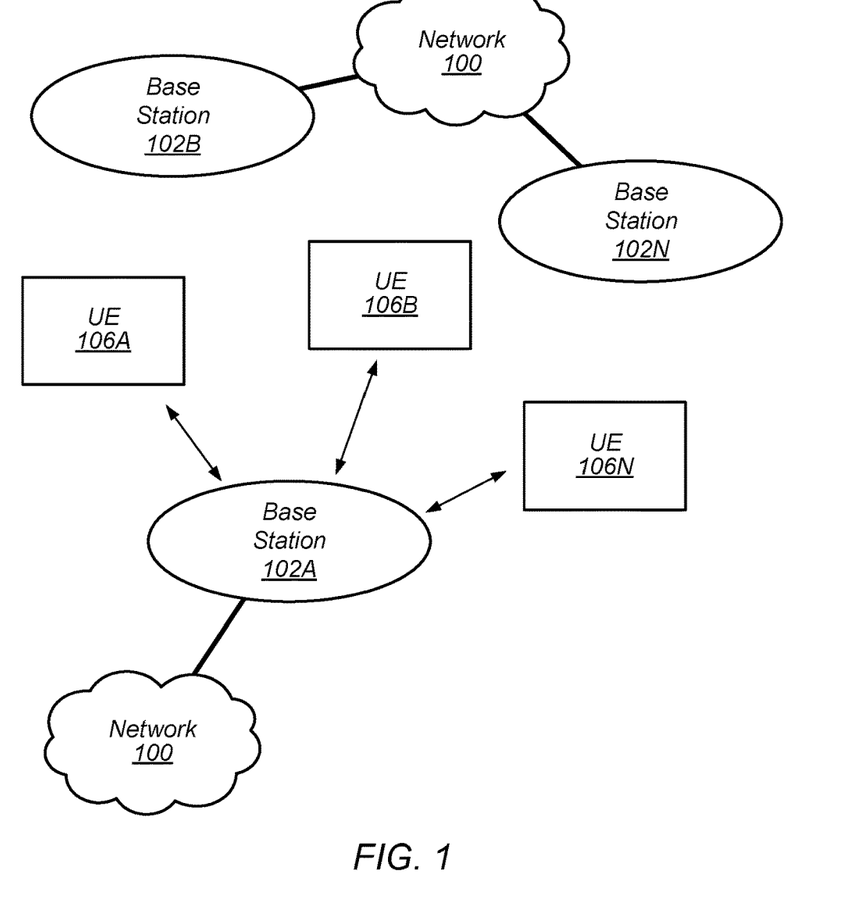
FIG. 1 illustrates an exemplary (and simplified) wireless communication system, according to some embodiments.
Figure 2:
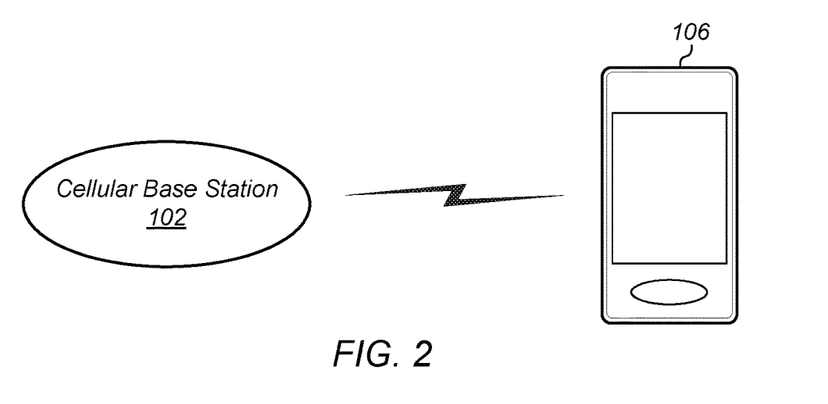
FIG. 2 illustrates an exemplary base station in communication with an exemplary wireless communication device (UE), according to some embodiments.

FIGS. 1 and 2—Communication System

FIG. 1 illustrates a simplified exemplary wireless cellular communication system. It is noted that the system of FIG. 1 is merely one example of a possible cellular communication system, and embodiments of the invention may be implemented in any of various systems as desired.

As shown, the example wireless cellular communication system includes base stations 102A, 102B . . . 102N, which, for the purposes of description herein, may be collectively referred to as base station 102. Base station 102 communicates over a transmission medium with one or more user devices 106A, 106B . . . 106N, which, for the purposes of description herein, may be collectively referred to as UE 106. Each of the user devices may be referred to herein as a "user equipment" (UE). Thus, the user devices 106 are also referred to as UEs 106 or UE devices 106.

The base station 102 may be a base transceiver station (BTS) or cell site or an eNB, and may include hardware that enables wireless cellular communication with the UEs 106A-106N. The base station 102 may also be equipped to communicate with a network 100. Thus, the base station 102 may facilitate communication between the UEs and/or between the UEs and the network 100. The communication area (or coverage area) of each base station may be referred to as a "cell." Furthermore, network 100 may be representative of one or more base stations facilitating communications of UEs 106 according to a specific radio access technology (RAT) as described above, with the base stations acting/operating as network access points. As will be further described below, a network, e.g. a cellular) network, may include additional access points beside the one or more base stations. In general, base station 102 may be considered a network element responsible for radio transmission and reception in one or more cells to or from UEs 106A-106N. Base station 102 may have an integrated antenna or be connected to an antenna by feeder cables. Furthermore, a "cell" may be defined as a network object that may be uniquely identified by UE 106 from a (cell) identification that is broadcast over a geographical area from a network access point. Thus, a "cell" may also be considered a logical identity for a given coverage area at a given frequency. Base station 102 may serve any number of cells, and cells served by base station 102 may or may not be collocated.

The base station 102 and the UEs 106 may be configured to communicate over the transmission medium using any of various wireless communication technologies or RATs, including cellular RATs such as GSM, UMTS, LTE, LTE-Advanced, CDMA, W-CDMA, and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or WiFi), WiMAX, etc.

In some embodiments, UE 106 may be capable of communicating using multiple radio RATs. For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary UE 106 (e.g., one of the UEs 106A-106N) in communication with an exemplary base station 102, according to some embodiments. As defined above, the UE 106 may be a device with wireless cellular network connectivity such as a mobile phone, a hand-held device, a computer or a tablet, or virtually any type of wireless device. The base station may be a cellular base station that communicates in a wireless cellular manner with one or more UEs.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

The base station may include a processing element such as one or more of a processor, an ASIC (application specific integrated circuit), an FPGA (field-programmable gate array) or some combination thereof. The base station, such as the processing element in the base station, may perform any of the methods described herein as being performed by a base station. Other cellular network devices, described below, may also be configured to perform some or all of the methods described herein, possibly in conjunction with the base station.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

The UE may be associated with, e.g., subscribe to, a cellular carrier. Examples of cellular carries in the United States include Verizon, AT&T, Sprint, and T-Mobile.

Figure 3:
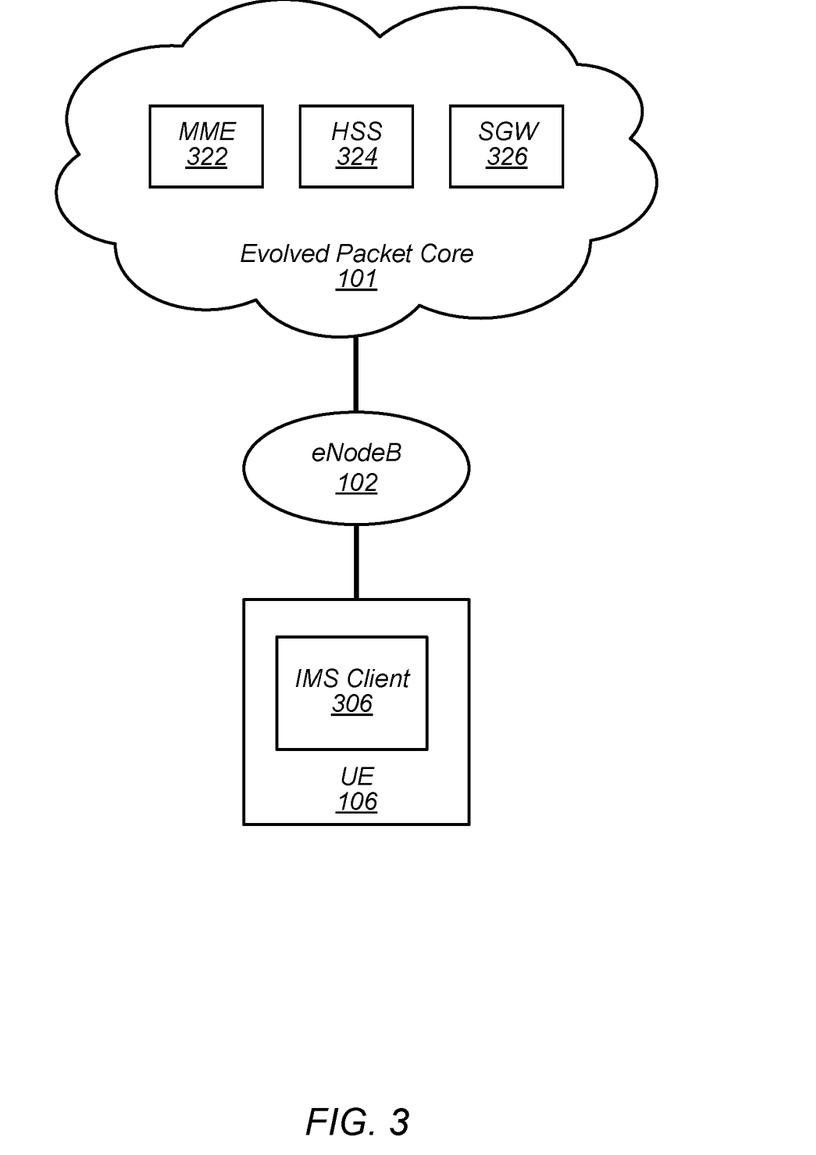
FIG. 3 illustrates an exemplary cellular network system according to some embodiments.

FIG. 3 illustrates a simplified portion of an exemplary wireless communication system that may be used in some embodiments. As shown in FIG. 3, the UE 106 may be in communication with a cellular network, where the cellular network may include a base station 102 and an evolved packet core (EPC) 101, as shown, among other possible elements. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 101. As shown, the EPC 101 may include mobility management entity (MME) 322, home subscriber server (HSS) 324, and serving gateway (SGW) 326. The EPC 101 may include various other devices known to those skilled in the art as well.

Operations described herein as being performed by the cellular network (or simply referred to as "the network") may be performed by one or more of the cellular network devices shown in FIG. 3, such as one or more of base station, 102, MME 322, HSS 324, or SGW 326 in EPC 100, among possible others.

Figure 4:
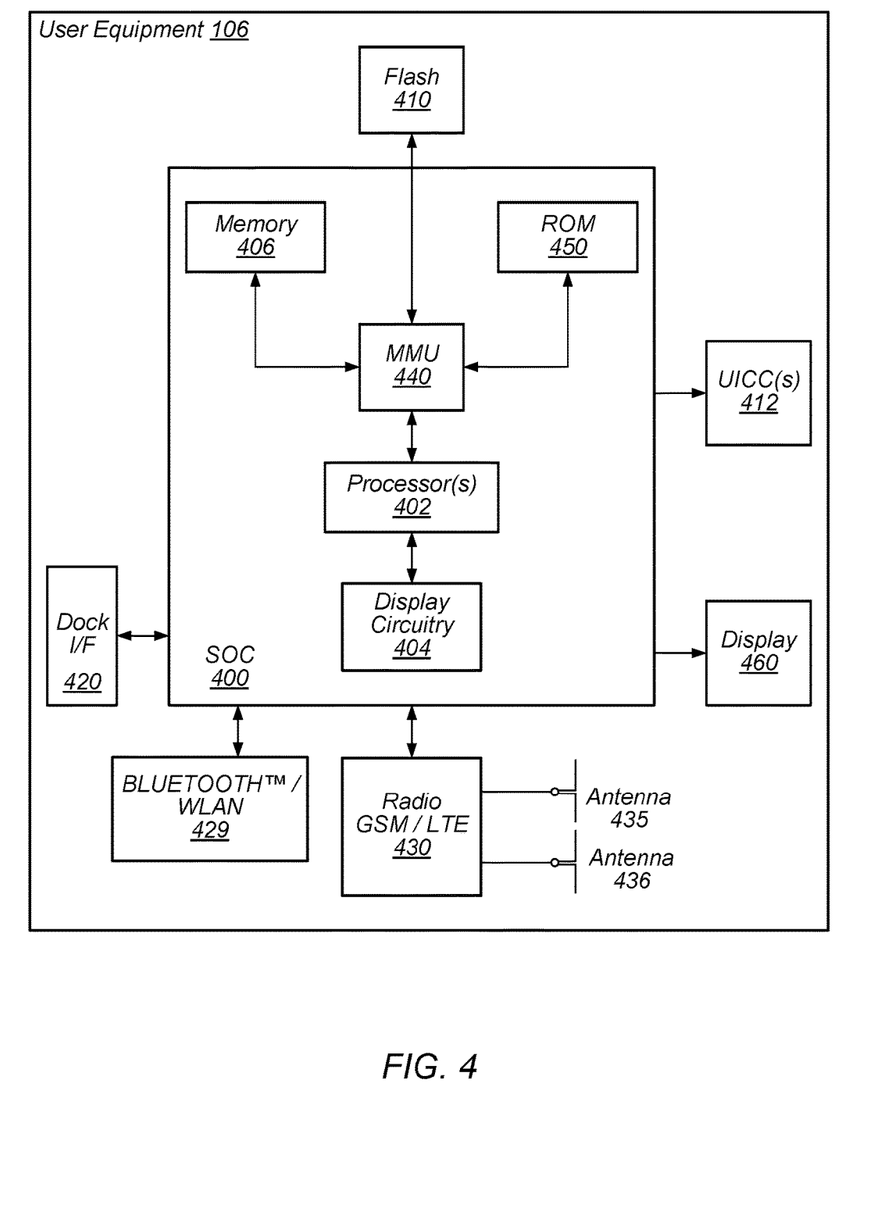
FIG. 4 illustrates the block diagram of an exemplary UE, according to some embodiments.

FIG. 4—Example Block Diagram of a UE

FIG. 4 illustrates a block diagram of an exemplary UE 106, according to some embodiments. As shown, the UE 106 may include a system on chip (SOC) 400, which may include portions for various purposes. For example, as shown, the SOC 400 may include a processing element, such as processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, radio 430, BLUETOOTH™ and WLAN interface 429, connector I/F 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 460, and wireless communication circuitry (e.g., for LTE, LTE-A, CDMA2000, GSM, BLUETOOTH™, Wi-Fi, etc.).

The UE device 106 may include at least one antenna, and in some embodiments multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments. In some embodiments UE 106 may be designed to use both antennas 435 and 436 to perform wireless cellular communications.

As described herein, the UE 106 may include a processing element, e.g., hardware and/or software components for implementing methods according to embodiments of this disclosure.

The processing element of the UE device 106 may be processor(s) 402 configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

Figure 5:
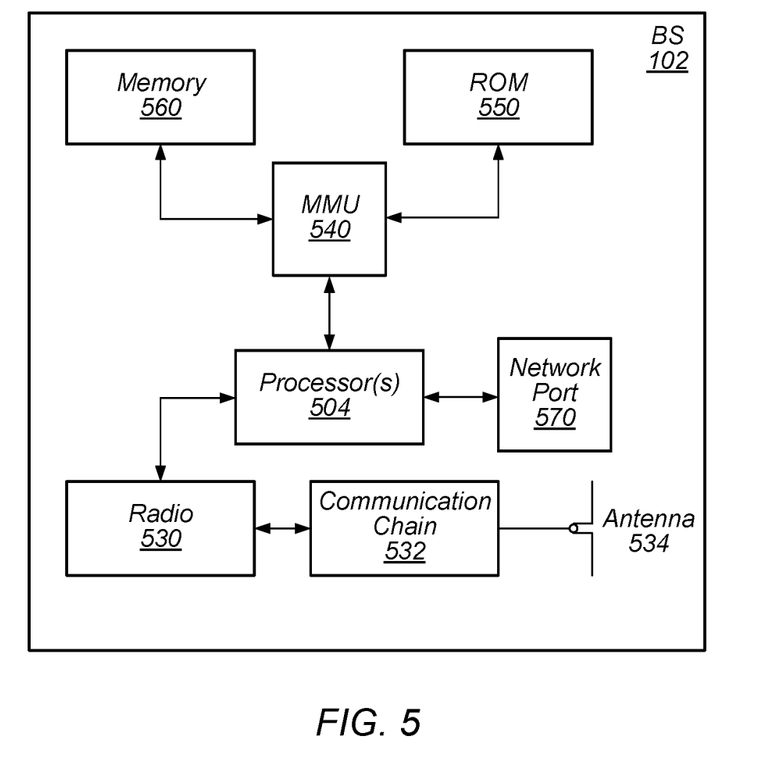
FIG. 5 illustrates the block diagram of an exemplary base station, according to some embodiments.

FIG. 5—Base Station

FIG. 5 illustrates a block diagram of an exemplary base station 102, according to some embodiments. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processing element, such as processor(s) 504, of the base station 102 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Radio Link Monitoring

In general, the design and development of cellular networks was performed under the assumption that devices have regular link budget characteristics, e.g., for devices such as smart phones, tablets, etc. "Regular", in this context, may simply refer to an expected power spectrum or power range typically associated with wireless transmissions of control signaling and data to and/or from the devices. E.g., various wireless communication device may be expected to require a certain power (or power within a certain range) for transmission of control signaling and data to and/or from the devices. However, with the introduction of a new class of devices, in particular wearable devices such as smart watches, which are link-budget-limited, certain network parameters may result in sub-optimal operation for the link-budget-limited devices.

For example, a UE device that is 3GPP compliant may be configured to monitor the radio link from the base station (eNodeB) and make a determination whether the radio link has failed in terms of not having the capability or capacity to support the lowest acceptable link quality. For example, the UE may monitor the quality of the radio link between the bases station and the UE, to determine whether that radio link quality is supports communications between the UE and the base station. The radio link monitoring (RLM) procedure currently specified by 3GPP (e.g. in section 7.6 of 3GPP TS 36.133) is a hysteresis-based threshold comparison of the serving cell channel quality with two thresholds called "Qin" and "Qout". That is, the RLM procedure may include a hysteresis-based comparison that uses two threshold values, where the first threshold value ("out of sync" threshold Qout) is defined as the level at or above which the Physical Downlink Control Channel (PDCCH) block error rate (BLER) is higher than a specified first percentage (e.g. 10%) for the UE. The second threshold value ("in sync" threshold Qin) is defined as the level at or below which the PDCCH BLER is lower than a specified second percentage (e.g. case 2%) for the UE. With respect to LTE, the format of the Downlink Control Information (DCI) for this hypothetical PDCCH is specified by the 3GPP specification[s].

The UE typically bases its estimate of the PDCCH BLER on its downlink (DL) Signal-to-Noise Ratio (SNR) computation using cell-specific reference signals (CRS) and its mapping to a channel quality metric associated with a certain target BLER. The BLER estimate is filtered by higher UE layers, which provide a radio link failure (RLF) decision based on the filtered BLER estimates. The UE may determine the radio link quality in every DL subframe in which it is awake (as specified in 3GPP TS 36.213, section 4.2.1). However the base station (eNodeB) may restrict the subframes over which RLM is conducted/performed (e.g. as specified in 3GPP TS 36.331).

Radio Link Monitoring by Link-Budget-Limited Devices

In some embodiments, devices considered to be link-budget-limited UEs (e.g. wireless communication devices that belong to a class designated to include or correspond to link-budget-limited devices) may identify themselves to the network as being such a device, based on an agreed-upon protocol which may fall outside the scope of current 3GPP specifications. In response to being informed by the device that the device is a link-budget-limited device, (or is a class of device that includes link-budget-limited devices) the network may enable special link budget enhancing features for this class of UEs. One such feature may be the network (e.g., the base station or eNB, in some embodiments) boosting the power of the resource elements (RE) carrying PDCCH and PDSCH for the UE. That is, the cellular network (or base station) may operate to boost, or increase the power used for (or associated with) transmission of the resource elements carrying signal[s] and data associated with the physical channels for the UE. For example, the network may use higher power level(s) to transmit those resource elements carrying the signal[s] and data associated with the physical channels for the UE than the power level(s) at which the network would be transmitting those resource elements under normal operating conditions. The higher power level(s) may also represent an increase with respect to the power level(s) used by the network for (or the power associated with) transmitting the same resource elements to all other devices with which the base station (or the cellular network) conducts wireless communications. However, the power level(s) for transmitting CRS may not be boosted because CRS are not UE specific, that is, they are not specific to the UE, and therefore affect communications of the base station or network with other wireless communication devices as well. The power boosting may be enabled at the discretion of the cellular network when the cellular network determines that the UE is in a coverage scenario where the UE may not be able to otherwise sustain the link. For example, the network may determine whether a power boost is required in order for the UE to be able to sustain the radio link to the network, and the network may boost or not boost the power accordingly.

In some embodiments, the power level(s) of REs carrying CRS relative to the power level(s) of REs carrying data may be determined according to one or more network configured parameters. Specifically in the case of LTE, these parameters are the pA and pB parameters per 3GPP specifications. The power boost, when applied, may result in power level(s) that are above the values or above power level(s) determined based on these parameters. The boosting of PDCCH power (or the power level(s) used for transmitting the PDCCH) improves the achievable BLER on the PDCCH for the UE. But since the RLM computation is based on the prediction of hypothetical PDCCH BLER based on CRS, it predicts the same BLER regardless of whether the power boost is enabled or not. Therefore, at the UE, there is a need to detect the presence of power boost and adjust the RLM thresholds in the presence of power boost to reflect the improvement in the BLER due to the power boost.

Improved Radio Link Monitoring

In at least some embodiments described herein, a link-budget-limited wireless communication device may implement improved radio link monitoring procedures for enhancing the link-budget of the wireless communication device, or, in other words, for reducing any link-budget limiting the wireless communication device may be subject to. As previously mentioned, the wireless communication device may belong to a specified class of link-budget-limited wireless communication devices (or link-budget-limited UEs), which may identify themselves—based on an agreed upon protocol with the network, for example—to the network (or cell, or base station) as being a link-budget-limited device. The network may then enable special link-budget enhancing features for the UE, including boosting the power of the resource elements (RE) carrying PDCCH and PDSCH signaling and/or data (physical channel signaling/data) for the UE. The network may boost the power used for transmitting the REs carrying the above referenced signaling and/or data by a specified amount, for example by selecting a boost value from a specified (discrete) set of values, such as 1 dB to 6 dB in some embodiments. The UE may then detect the presence of such power boost on REs carrying data for the UE, e.g. on PDCCH and PDSCH. In some embodiments, the power boost may be detected and/or identified for each transmit time interval (TTI). That is, the UE may perform a power boost detection at each TTI.

Detecting Power Boost According to Some Embodiments

In some embodiments, the UE may determine the relative power level of cell-specific reference signals (CRS) and data-carrying REs based on a specified set of one or more network parameters. For example, the UE may use one or more specified parameters corresponding to the RAT network on which the UE is communicating, to determine the relative power level of reference signals corresponding to the given network and also to determine the power level of REs carrying data during the wireless communications over the given network. For example, when the given network is a 3GPP network (e.g. LTE network), the first network parameter may be pA (indicative of the ratio of the data subcarrier power of OFDM symbols excluding pilot symbols to the pilot subcarrier power) and the second network parameter may be pB (indicative of the ratio of the data subcarrier power of OFDM symbols including pilot symbols to the pilot subcarrier power), as described for example in section 5.2 of the 3GPP TS 36.213 specification. Network parameter pB (more specifically, the value of network parameter pB) is broadcast in system information block 2 (SIB2), while network parameter pA (more specifically, the value of network parameter pA) is included in radio resource control (RRC) connection setup message[s].

For a first physical channel, for example the Physical Downlink Shared Channel (PDSCH), the UE may measure a first power value, which may be the average power of the REs carrying the reference signal[s] corresponding to the given network (e.g. the average power used for transmitting the REs carrying CRS) in resource blocks (RBs) allocated for data transmitted to the UE. Similarly, the UE may measure a second set of power values representative of the average power of data-carrying REs in the above referenced RBs for symbols that have reference signal REs. The second set of power values may be further representative of the average power of data-carrying REs in the above referenced RBs on symbols that do not have reference signal REs. Subsequently, the UE may adjust—based on pA and pB— the second power values for the relative power difference to determine the average power of a data-carrying RE. This adjusted power value is referred to as the adjusted second power value. The UE may then compare the adjusted second power value (average power of a data-carrying RE) with the first power value (average power of a reference signal carrying RE). If the ratio of the adjusted second power value (ASPV) to the first power value (FPV) is greater than a specified threshold, e.g. if ASPV/FPV is greater than a specified value, then the UE may assume the presence of power boost on the first physical channel (e.g. on the PDSCH).

For a second physical channel, e.g. the Physical Downlink Control Channel (PDCCH), the UE may measure a third power value, which may be the average power of the REs carrying the reference signal[s] corresponding to the given network (i.e. the average power of the REs carrying CRS) allocated for the symbols associated with the second physical channel (e.g. the control channel). For an assumed aggregation level and location in user-specific search space, the UE may measure a fourth set of power values, which may be representative of the average power of the REs carrying the information/data for the second physical channel (e.g. the average power of the REs carrying the PDCCH) in symbols that do not contain reference signal carrying REs. The fourth set of power values may also be representative of the average power of the REs carrying the information/data for the second physical channel (e.g. the average power of the REs carrying the PDCCH) in symbols that contain REs that carry reference signals. The UE may follow a procedure similar to the procedure described above with respect to the first physical channel (PDSCH). That is, the UE may adjust the fourth set of power values for the relative power difference based on pA to compute the average power of an information/data RE and compare the adjusted fourth power value with the third power value. This set of adjusted power values is referred to as the adjusted fourth power value or adjusted fourth set of power values. If the ratio of adjusted fourth power value (AFPV) to the third power value (TPV) is greater than a specified threshold, e.g. if AFPV/TPV is greater than a specified value, then the UE may assume the presence of power boost on the second physical channel (e.g. on the PDCCH).

It should also be noted that by comparing the ratio of data RE power to CRS RE power, the UE may also estimate the amount (or degree, or percentage, or level) of the power boost. For example, as mentioned above, in some embodiments the network may boost the power by a specified amount, for example by selecting a boost value from a specified (discrete) set of values, such as 1 dB to 6 dB. By comparing the ratio of data RE power to CRS RE power, the UE may estimate which power boost value was used by the network when boosting the power.

Detecting Power Boost According to Additional Embodiments

In some embodiments, the UE may report channel quality indicators (CQIs) or CQI values to the network (e.g. to the base station or eNodeB) as set forth according to the communication protocols of the RAT used for the wireless communications (e.g. according to LTE specifications during LTE communications). When the UE reports a CQI value that is within a specified range of values, for example if the CQI value is zero or one, the UE may assume that the base station (or the network) will boost the power for the first physical channel and the second physical channel (e.g. for PDSCH and PDCCH) for the UE in order to improve the link-budget for the UE. At this point, the UE may start using modified thresholds for the RLM procedure until the CQI improves.

Alternatively (or in addition), in some embodiments, when the UE receives PDSCH data/signaling with a modulation and coding scheme index (I_MCS) value that is within a specified range indicative of a transport block size that is easiest to decode, e.g. I_MCS=0, the UE may assume that the network has begun boosting the power for the first physical channel and the second physical channel (e.g. PDSCH and PDCCH) for the UE, and may use modified thresholds for the RLM procedure accordingly. When performing the alternate methods of detecting power boost, the UE may be operating under the presumption that the power boost is the same for both physical channels, and that the power boost level does not change from transmit time interval to transmit time interval.

Use of Modified Thresholds

According to at least the power boost detection described above, the UE may use modified RLM thresholds in the RLM procedure if the UE has determined that the REs carrying data/signaling for the physical channels (e.g. PDCCH and PDSCH) intended for (or targeting) the UE have been power boosted by the network. At least in some embodiments, as described above, detecting power boost allows the UE to determine the amount or level of boost applied by the network, which may allow the UE to also select the modified RLM threshold[s]. For example, similar to how the network may boost the power according to values selected from a set (such as 1 dB to 6 dB, e.g.), the UE may also select the modified RLM threshold(s) from a set of values which may correspond to the values/levels by which the network has boosted the power. Accordingly, the network may use a set of boost values, while the UE may use a set of RLM threshold values that corresponds to the set of boost values used by the network (e.g. by an eNB).

The alternate methods of detecting the power boost as described above may be considered more limited, generally allowing for the determination/detection of the presence or absence of power boost, without precisely determining the possible value of the power boost. In such cases, in some embodiments, the UE may consider the power boost value to be a specified or set value, such as a specified maximum value (e.g., 6 dB in the power boost value range/set example provided above), and may adjust the RLM threshold (value) based on that specified power boost value. Alternatively, the UE may compare the measured downlink block error rate (DL BLER) value—measured, for example, on the first HARQ transmission—with a BLER value corresponding to the particular Signal-To-Interference-Plus-Noise Ratio (SINR) if there were no power boosting by the network. The UE may store a lookup table that maps the effective DL SINR (similar to the measurements of CQI) to the BLER value, and may determine the actual power boost value by measuring the actual DL BLER. The UE may perform the power boost value estimation/determination according to the actual DL BLER with the assumption that the power boost for both physical channels (e.g. PDCCH and PDSCH) is the same. In some embodiments, the UE may adjust the threshold in a closed-loop manner until the measured BLER value converges towards the corresponding BLER value derived from (or stored in) the lookup table. For example, the UE may keep adjusting the threshold or threshold value until the measured BLER value and the BLER value stored in the lookup table (and based on the SINR) are equal to each other or do not differ from each other by more than a specified difference value.

Figure 6:
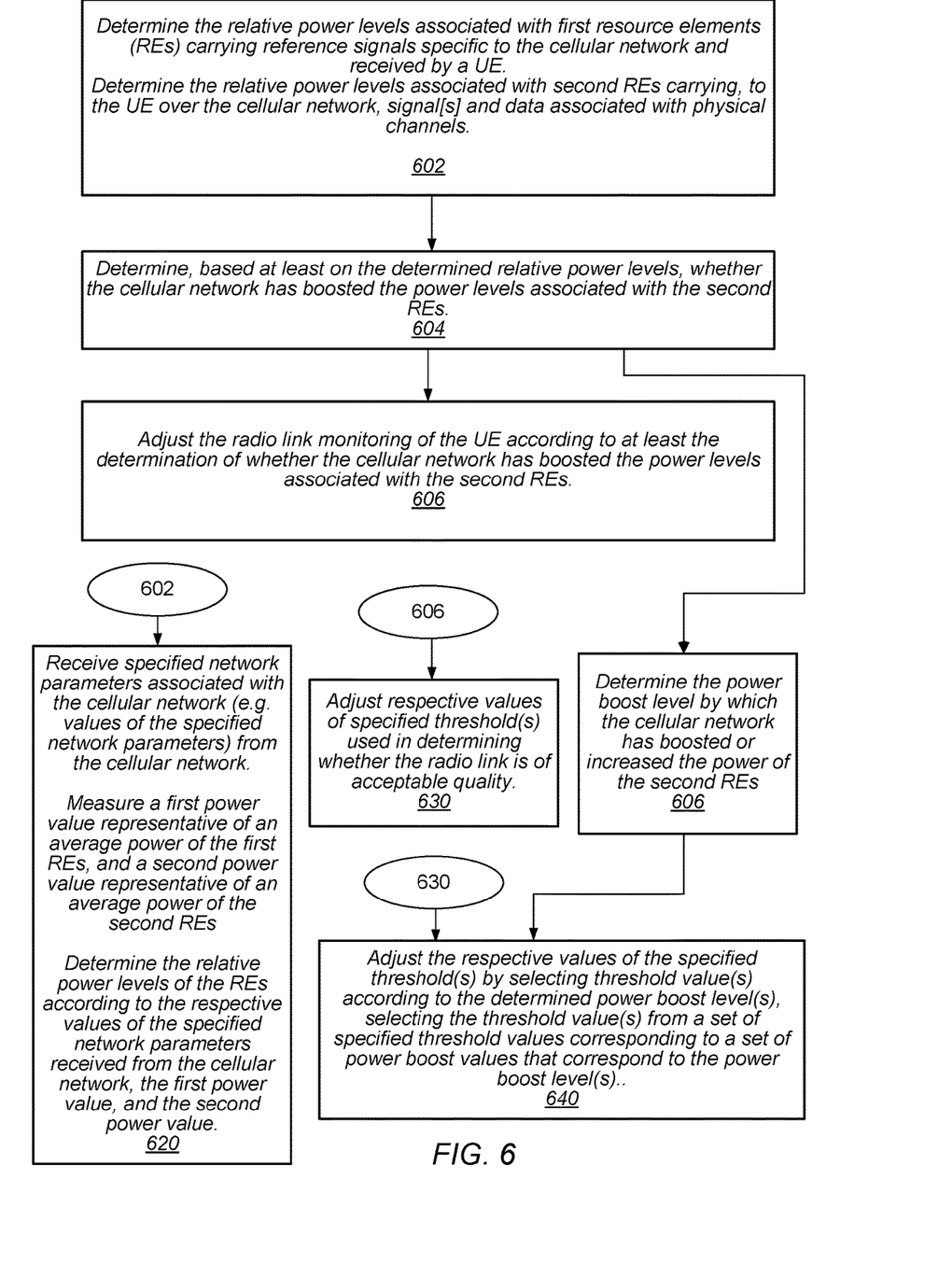
FIG. 6 is a flowchart diagram of an exemplary method for a link-budget-limited UE performing radio link monitoring, according to a first set of embodiments.

FIG. 6

FIG. 6 is a flowchart diagram of an exemplary method for a link-budget-limited UE performing radio link monitoring, according to a first set of embodiments. As shown in FIG. 6, the UE may determine relative power levels of first REs and second REs, with the first REs carrying reference signals specific to the cellular network and received by the UE, and the second REs carrying—to the UE over the cellular network—signal[s] and/or data associated with physical channels (602). The UE may determine whether the cellular network has boosted, or increased power of the second REs, based at least on the determined relative power levels (604), and may adjust radio link monitoring of the UE according to at least the determination of whether the cellular network has boosted the power of the second REs (606).

In determining the relative power levels of the first and second REs, the UE may measure a first power value representative of an average power of the first REs, and a second power value representative of an average power of the second REs. The UE may also receive specified network parameters associated with the cellular network (e.g. the UE may receive values of the specified network parameters) from the cellular network, and may determine the relative power levels of the REs according to at least the first power value, second power value, and the respective values of the specified network parameters (620). The UE may adjust the radio link monitoring by adjusting respective values of specified threshold(s) used in determining whether the radio link is of acceptable quality (630). The UE may also determine the power boost level by which the cellular network has boosted or increased the power of the second REs (606), and may adjust the threshold(s) by selecting threshold value(s) according to the determined power boost level, selecting the threshold value(s) from a set of specified threshold values corresponding to a set of power boost values (640). Again, the "power level of an RE" is in reference to the power level(s) at which the REs are transmitted.

Figure 7:
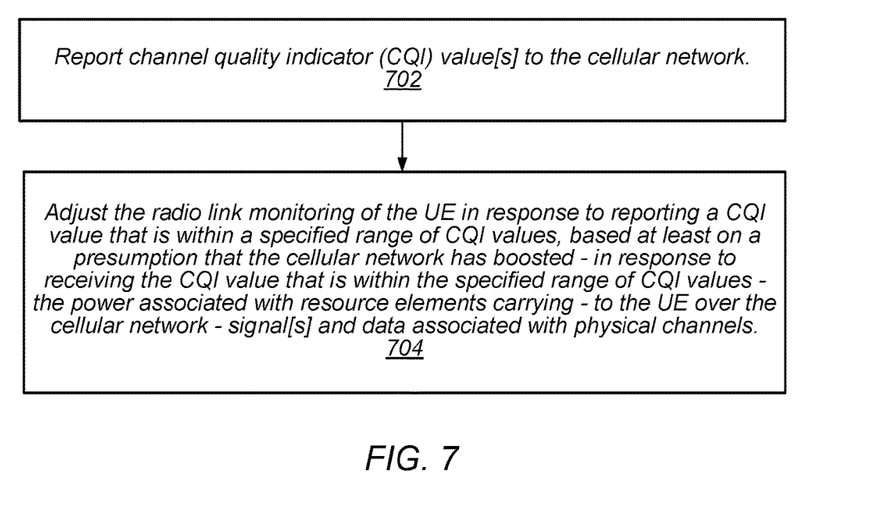
FIG. 7 is a flowchart diagram of an exemplary method for a link-budget-limited UE performing radio link monitoring, according to a second set of embodiments.

FIG. 7

FIG. 7 is a flowchart diagram of an exemplary method for a link-budget-limited UE performing radio link monitoring, according to a second set of embodiments. As shown in FIG. 7, the UE may report channel quality indicator (CQI) value[s] to a cellular network (702), and responsive to reporting a CQI value that is within a specified range of CQI values, the UE may adjust radio link monitoring of the UE (704). The UE may adjust the radio link monitoring based on a presumption that the cellular network has boosted, in response to the cellular network receiving the CQI value that is within the specified range of CQI values, a power of REs carrying—to the UE over the cellular network—signal[s] and data associated with physical channels (704).

Figure 8:
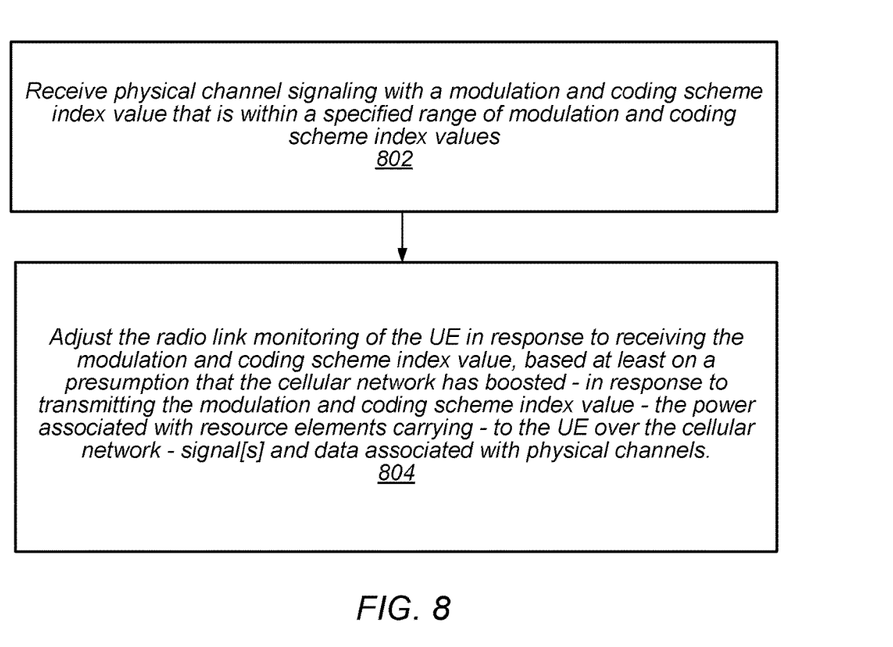
FIG. 8 is a flowchart diagram of an exemplary method for a link-budget-limited UE performing radio link monitoring, according to a third set of embodiments.

FIG. 8

FIG. 8 is a flowchart diagram of an exemplary method for a link-budget-limited UE performing radio link monitoring, according to a third set of embodiments. As shown in FIG. 8, the UE may receive physical channel signaling with a modulation and coding scheme index value that is within a specified range of modulation and coding scheme index values (802). Responsive to receiving the modulation and coding scheme index value that is within the specified range, the UE may adjust radio link monitoring of the UE (804). The UE may adjust the radio link monitoring based on a presumption that the cellular network has boosted or increased, responsive to the cellular network sending the modulation and coding scheme index value that is within the specified range, a power of resource elements carrying—to the UE over the cellular network—signal[s] and data associated with physical channels (804).

Various Embodiments

Pursuant to the above, in some embodiments, a UE may include at least one antenna, a radio coupled to the antenna for performing wireless cellular communications with a cellular network, and at least one processing element coupled to the radio. The UE may report channel quality indicator (CQI) value[s] to the cellular network. In response to reporting a CQI value that is within a specified range of CQI values, the UE may adjust its radio link monitoring. The UE may adjust its radio link monitoring based on a presumption that the cellular network has boosted the power of resource elements carrying signal[s] and data associated with physical channels to the UE over the cellular network, in response to receiving the CQI value (from the UE) that is within the specified range of CQI values.

In some embodiments, a UE may receive, from the cellular network, physical channel signaling with a modulation and coding scheme index value that is within a specified range of modulation and coding scheme index values. In response to receiving the modulation and coding scheme index value that is within the specified range, the UE may adjust its radio link monitoring. The UE may adjust its radio link monitoring (in response to the receiving the modulation and coding scheme index value that is within the specified range) based on a presumption that the cellular network has boosted, responsive to sending the modulation and coding scheme index value that is within the specified range, a power of resource elements carrying signal[s] and data associated with physical channels to the UE over the cellular network. The UE may also measure an error rate of a downlink hybrid automatic repeat request transmission, estimate an actual error rate on a physical downlink shared channel based on the measured error rate, perform a comparison of the estimated actual error rate with an error rate predicted based on an SINR on reference symbols, and estimate, based on the comparison, an amount of power boost being used/applied by the cellular network.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus for facilitating radio link monitoring, the apparatus comprising:
   a processing element configured to cause a device to:
      perform wireless communications with a cellular network;
      receive, from the cellular network, a physical channel signaling with a specific modulation and coding scheme index value that falls within a specified range of modulation and coding scheme index values; and
      adjust radio link monitoring of the UE in response to receiving the specific modulation and coding scheme index value.

2. The apparatus of claim 1, wherein the processing element is configured to further cause the device to:
   adjust the radio link monitoring based on a presumption that the cellular network boosts power associated with specific resource elements because of the coding scheme index value falling within the specified range of modulation and coding scheme index values, wherein the specific resource elements are carrying, to the device over the cellular network, one or more signals and data associated with physical channels.

3. The apparatus of claim 2, wherein the processing element is configured to further cause the device to:
   estimate an amount of power boost being used by the cellular network to boost the power associated with the specific resource elements.

4. The apparatus of claim 3, wherein the processing element is configured to further cause the device to:
   measure an error rate of a downlink hybrid automatic repeat request transmission;
   estimate an actual error rate on a physical downlink shared channel based on the measured error rate;
   perform a comparison of the estimated actual error rate with an error rate predicted based on a Signal-To-Interference-Plus-Noise Ratio on reference symbols; and
   estimate the amount of power boost based on the comparison.

5. The apparatus of claim 2, wherein processing element is configured to further cause the device to operate based on a presumption of one or more of the following:
   the power associated with the specific resource elements is boosted by a same power boost level for a physical control channel and a physical data channel of the physical channels; or
   the power boost level does not change from transmit time interval to transmit time interval.

6. The apparatus of claim 1, wherein the processing element is configured to further cause the device to:
   adjust the radio link monitoring by adjusting respective values of specified thresholds used in determining whether the radio link is of acceptable quality.

7. The apparatus of claim 6, wherein the processing element is configured to further cause the device to:
   estimate a power boost level by which the cellular network boosts the power associated with the specific resource elements; and
   adjust the respective values of the specified thresholds by selecting threshold values, according to the estimated power boost level, from a set of specified threshold values corresponding to a set of power boost values.

8. A device comprising:
   radio circuitry comprising one or more antennas and configured to facilitate wireless communications of the device with a cellular network; and
   processing circuitry coupled to the radio circuitry and configured to interoperate with the radio circuitry to cause the device to:
      receive, from the cellular network, a physical channel signaling with a specific modulation and coding scheme index value that falls within a specified range of modulation and coding scheme index values; and
      adjust radio link monitoring of the device in response to receiving the specific modulation and coding scheme index value.

9. The device of claim 8, wherein the processing element is configured to interoperate with the radio circuitry to further cause the device to:
   adjust the radio link monitoring based on a presumption that the cellular network boosts power associated with specific resource elements because of the coding scheme index value falling within the specified range of modulation and coding scheme index values, wherein the specific resource elements are carrying, to the wireless communication device over the cellular network, one or more signals and data associated with physical channels.

10. The device of claim 9, wherein the processing element is configured to interoperate with the radio circuitry to further cause the device to:
    estimate an amount of power boost being used by the cellular network to boost the power associated with the specific resource elements.

11. The device of claim 10, wherein the processing element is configured to interoperate with the radio circuitry to further cause the device to:
    measure an error rate of a downlink hybrid automatic repeat request transmission;
    estimate an actual error rate on a physical downlink shared channel based on the measured error rate;
    perform a comparison of the estimated actual error rate with an error rate predicted based on a Signal-To-Interference-Plus-Noise Ratio on reference symbols; and estimate the amount of power boost based on the comparison.

12. The device of claim 9, wherein processing element is configured to further cause the device to operate based on a presumption of one or more of the following:
   the power associated with the specific resource elements is boosted by a same power boost level for a physical control channel and a physical data channel of the physical channels; or
   the power boost level does not change from transmit time interval to transmit time interval.

13. The device of claim 8, wherein the processing element is configured to interoperate with the radio circuitry to further cause the device to:
   adjust the radio link monitoring by adjusting respective values of specified thresholds used in determining whether the radio link is of acceptable quality.

14. The device of claim 13, wherein the processing element is configured to further cause the device to:
   estimate a power boost level by which the cellular network boosts the power associated with the specific resource elements; and
   adjust the respective values of the specified thresholds by selecting threshold values, according to the estimated power boost level, from a set of specified threshold values corresponding to a set of power boost values.

15. A non-transitory memory element storing instruction executable by a processing element to cause a device to:
   perform wireless communications with a cellular network;
   receive, from the cellular network, a physical channel signaling with a specific modulation and coding scheme index value that falls within a specified range of modulation and coding scheme index values; and
   adjust radio link monitoring of the UE in response to receiving the specific modulation and coding scheme index value.

16. The non-transitory memory element of claim 15, wherein the instructions are executable by the processing element to further cause the device to:
   adjust the radio link monitoring based on a presumption that the cellular network boosts power associated with specific resource elements because of the coding scheme index value falling within the specified range of modulation and coding scheme index values, wherein the specific resource elements are carrying, to the device over the cellular network, one or more signals and data associated with physical channels.

17. The non-transitory memory element of claim 16, wherein the instructions are executable by the processing element to further cause the device to:
   estimate an amount of power boost being used by the cellular network to boost the power associated with the specific resource elements.

18. The non-transitory memory element of claim 17, wherein the instructions are executable by the processing element to further cause the device to:
   measure an error rate of a downlink hybrid automatic repeat request transmission;
   estimate an actual error rate on a physical downlink shared channel based on the measured error rate;
   perform a comparison of the estimated actual error rate with an error rate predicted based on a Signal-To-Interference-Plus-Noise Ratio on reference symbols; and
   estimate the amount of power boost based on the comparison.

19. The non-transitory memory element of claim 15, wherein the instructions are executable by the processing element to further cause the device to:
   adjust the radio link monitoring by adjusting respective values of specified thresholds used in determining whether the radio link is of acceptable quality.

20. The non-transitory memory element of claim 19, wherein the instructions are executable by the processing element to further cause the device to:
   estimate a power boost level by which the cellular network boosts the power associated with the specific resource elements; and
   adjust the respective values of the specified thresholds by selecting threshold values, according to the estimated power boost level, from a set of specified threshold values corresponding to a set of power boost values.

* * * * *